United States Patent
Jeon

(10) Patent No.: US 9,387,858 B2
(45) Date of Patent: Jul. 12, 2016

(54) SYSTEM AND METHOD OF CONTROLLING SHIFT FOR VEHICLE

(71) Applicants: Hyundai Motor Company, Seoul (KR); Kia Motors Corporation, Seoul (KR)

(72) Inventor: Byeongwook Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 70 days.

(21) Appl. No.: 14/550,254

(22) Filed: Nov. 21, 2014

(65) Prior Publication Data

US 2016/0082970 A1    Mar. 24, 2016

(30) Foreign Application Priority Data

Sep. 22, 2014 (KR) .................. 10-2014-0126185

(51) Int. Cl.
  *B60W 30/18* (2012.01)
  *B60W 10/10* (2012.01)
  *B60W 10/18* (2012.01)
(52) U.S. Cl.
  CPC ......... *B60W 30/18136* (2013.01); *B60W 10/10* (2013.01); *B60W 10/18* (2013.01); *B60W 2510/069* (2013.01); *B60W 2510/0638* (2013.01); *B60W 2510/1005* (2013.01); *B60W 2520/10* (2013.01); *B60W 2520/105* (2013.01); *B60W 2540/10* (2013.01); *B60W 2540/12* (2013.01); *B60W 2540/18* (2013.01); *B60W 2550/142* (2013.01); *B60W 2550/306* (2013.01); *B60W 2550/308* (2013.01); *B60W 2710/1005* (2013.01)

(58) Field of Classification Search
None
See application file for complete search history.

(56) References Cited

U.S. PATENT DOCUMENTS

| | | | |
|---|---|---|---|
| 5,152,192 A | 10/1992 | Koenig et al. | |
| 2007/0270279 A1* | 11/2007 | Saitoh | F16H 61/16 477/110 |
| 2011/0106368 A1* | 5/2011 | Miura | B60W 40/12 701/31.4 |
| 2012/0143399 A1* | 6/2012 | Noumura | B60W 30/02 701/1 |
| 2015/0307103 A1* | 10/2015 | Kuroki | F16H 61/21 701/70 |

FOREIGN PATENT DOCUMENTS

| | | | |
|---|---|---|---|
| JP | 2001-235026 A | 8/2001 | |
| JP | 2002-235847 A | 8/2002 | |
| JP | 2005-98366 A | 4/2005 | |
| KR | 10-0285466 B1 | 1/2001 | |

* cited by examiner

*Primary Examiner* — Justin Holmes
(74) *Attorney, Agent, or Firm* — Morgan, Lewis & Bockius LLP

(57) ABSTRACT

A system of controlling shift for a vehicle may include a data detector configured to detect data for a shift control; a road shape determiner configured to determine a road shape of an inclined road based on the data; an engine brake tendency determiner configured to determine an engine brake operating tendency of a driver based on the data; and an engine brake operating stage determiner configured to determine an engine brake operating stage based on the road slope and the engine brake operating tendency of the driver, wherein the system controls the shift according to the engine brake operating stage determined by the engine brake operating determiner.

14 Claims, 4 Drawing Sheets

SYSTEM AND METHOD OF CONTROLLING SHIFT FOR VEHICLE

CROSS-REFERENCE TO RELATED APPLICATION

The present application claims priority to and the benefit of Korean Patent Application No. 10-2014-0126185 filed on Sep. 22, 2014, the entire contents of which is incorporated herein for all purposes by this reference.

BACKGROUND OF THE INVENTION

1. Field of the Invention

The present invention relates to a system and a method of controlling shift for a vehicle. More particularly, the present invention relates to a system and a method of controlling shift for a vehicle that differently controls an engine brake amount by controlling shift according to deceleration tendency of a driver on a downhill road.

2. Description of Related Art

Customer satisfaction of the driving performance of a vehicle depends on how precisely the vehicle runs in accordance with the driving tendency of the driver. While tendencies of the customers vary, however, performance characteristic of the vehicle is set to one performance characteristic in the same vehicle model. Therefore, reaction of the vehicle may not coincide with the tendency of the customer. Accordingly, the customer often lodges a complaint against the driving performance of the vehicle. That is, if the driving tendency of the customer is grasped and a shift of the vehicle is controlled to coincide with the tendency of the customer, the customer satisfaction related to the driving performance may be maximized. Therefore, many methods of learning the driving tendency of the customer and controlling the shift according to the learned driving tendency have been developed.

If a foot brake of the vehicle is operated excessively on a downhill road, it may affect safety of the vehicle. Thus, a driver should use a manual shift mode and operate an engine brake by shifting to lower speed-stage for safety of the vehicle. However, a general driver of an automatic transmission vehicle coasts on the downhill road without operating the engine brake, so a vapor lock phenomenon due to abrasion or overheating of a brake is generated.

Conventionally, a method that automatically operates the engine brake when the vehicle coasts on the downhill road in order to prevent the vapor lock phenomenon has been applied. However, the driver may feel disharmony about an unintended operation of the engine brake.

In other words, the conventional method may be convenient for drivers who usually operate the engine brake in the manual shift mode, but it is unfamiliar to drivers who hardly use manual shift mode.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method of controlling shift for a vehicle having advantages of differently controlling an engine brake amount by controlling shift according to deceleration tendency of a driver on a downhill road.

An aspect of the present invention provides a system of controlling shift for a vehicle that may include a data detector configured to detect data for a shift control, a road shape determiner configured to determine a road shape of an inclined road based on the data, an engine brake tendency determiner configured to determine an engine brake operating tendency of a driver based on the data, and an engine brake operating stage determiner configured to determine an engine brake operating stage based on the road slope and the engine brake operating tendency of the driver, wherein the system controls the shift according to the engine brake operating stage determined by the engine brake operating determiner.

The data may include information on at least one of a speed of the vehicle, an acceleration of the vehicle, a shift-speed, a position of an accelerator pedal, a position of a brake pedal, a steering angle of the vehicle, and a distance between the driver's vehicle and a forward vehicle.

The shift control may include a change of a shift pattern, a change of engaging feeling to a target shift-speed, a change of an engine torque map and a change of an engine torque filter.

The engine brake tendency determiner may determine the engine brake operating tendency of the driver by calculating an engine brake strength index and an engine brake handling tendency index when the vehicle currently coasts on a downhill road with a manual shift mode.

The engine brake strength index may be calculated according to a region classified by a vehicle speed and a target engine speed where a current engine speed belongs.

The engine brake handling tendency index may be calculated by accumulating the engine brake strength index during a predetermined time.

The engine brake operating stage determiner may determine the engine brake operating stage based on the engine brake handling tendency index calculated by the engine brake tendency determiner.

The engine brake operating stage determiner may determine the engine brake operating stage by setting the engine brake handling tendency index as a basic value when the engine brake handling tendency index is not calculated.

Another exemplary embodiment of the present invention provides a method of controlling shift for a vehicle that may include detecting data for a shift control, determining whether the vehicle currently coasts on a downhill road, determining whether a shift mode of the vehicle is a manual shift mode when the vehicle currently coasts on the downhill road, calculating an engine brake handling tendency index when the shift mode of the vehicle is the manual shift mode, determining an engine brake operating stage based on the engine brake handling tendency index, and controlling a shift according to the engine brake operating stage when the shift mode of the vehicle is an automatic shift mode.

The method may further include setting the engine brake handling tendency index as a basic value when the shift mode of the vehicle is not the manual shift mode.

The engine brake handling tendency index may be calculated by calculating an engine brake strength index.

The engine brake strength index may be calculated according to a region classified by a vehicle speed and a target engine speed where a current engine speed belongs.

The engine brake handling tendency index may be calculated by accumulating the engine brake strength index during a predetermined time.

The data may include information on at least one of a speed of the vehicle, an acceleration of the vehicle, a shift-speed, a position of an accelerator pedal, a position of a brake pedal, a steering angle of the vehicle, and a distance between the driver's vehicle and a forward vehicle.

As described above, according to an exemplary embodiment of the present invention, the engine brake amount is adjusted by controlling shift according to deceleration tendency of a driver on a downhill road, so a disharmony of the driver may be minimized.

In addition, safety of the vehicle can be improved by operating a minimum engine brake on the downhill road instead of operating an excessive foot brake.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
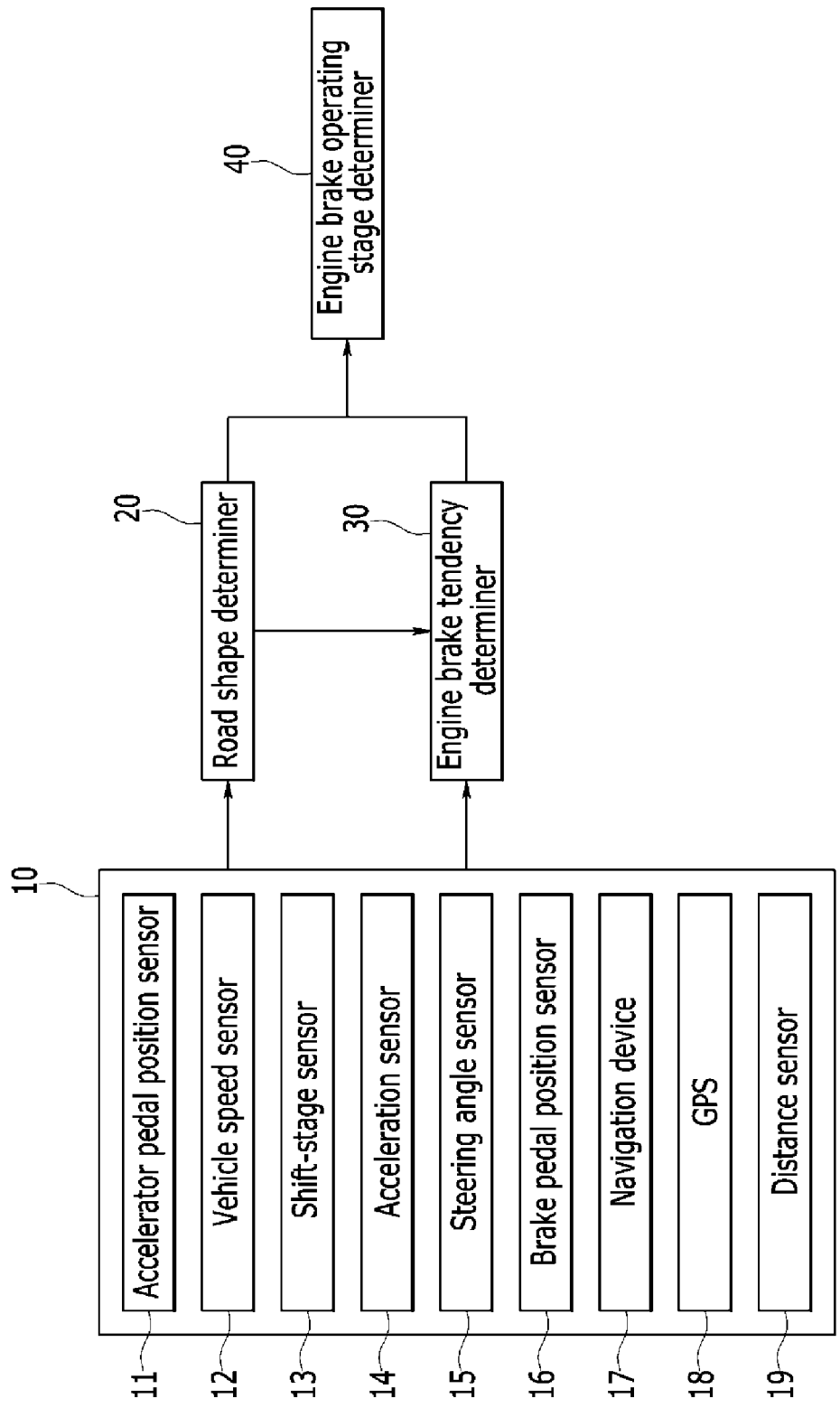
FIG. 1 is a block diagram of a system of controlling shift for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Throughout this specification and the claims which follow, unless explicitly described to the contrary, the word "comprise" and variations such as "comprises" or "comprising" will be understood to imply the inclusion of stated elements but not the exclusion of any other elements.

Like reference numerals designate like elements throughout the specification.

An exemplary embodiment of the present invention will hereinafter be described in detail with reference to the accompanying drawings.

FIG. 1 is a block diagram of a system of controlling shift for a vehicle according to an exemplary embodiment of the present invention.

As shown in FIG. 1, a system of controlling shift for a vehicle according to an exemplary embodiment of the present invention includes a data detector 10, a road shape determiner 20, an engine brake tendency determiner 30 and an engine brake operating stage determiner 40.

The data detector 10 detects data for shift control, and the data detected by the data detector 10 is transmitted to the road shape determiner 20 and the engine brake tendency determiner 30. The data detector 10 includes an accelerator pedal position sensor 11, a vehicle speed sensor 12, a shift-stage sensor 13, an acceleration sensor 14, a steering angle sensor 15, a brake pedal position sensor 16, a navigation device 17, a global positioning system (GPS) 18 and a distance sensor 19.

The accelerator pedal position sensor 11 detects a degree with which a driver pushes an accelerator pedal. That is, the accelerator pedal position sensor 11 detects the data related to driver's acceleration will.

The vehicle speed sensor 12 detects a vehicle speed, and is mounted at a wheel of the vehicle. On the contrary, the vehicle speed may be calculated based on a GPS signal received by the GPS 18.

Meanwhile, a target shift-speed may be calculated by using a shift pattern based on the signal of the accelerator pedal position sensor 11 and the signal of the vehicle speed sensor 12, and the shift to the target shift-speed is controlled. That is, hydraulic pressure supplied to a plurality of friction elements or released from the plurality of friction elements is controlled in an automatic transmission provided with a plurality of planetary gear sets and the plurality of friction elements. In addition, current applied to a plurality of synchronizer devices and actuators is controlled in a double clutch transmission.

The shift-speed sensor 13 detects a shift-speed that is currently engaged.

The acceleration sensor 14 detects an acceleration of the vehicle. The acceleration sensor 14 may be mounted in addition to the vehicle speed sensor 12 and may directly detects the acceleration of the vehicle, or the acceleration sensor 14 may calculates the acceleration of the vehicle by differentiating the vehicle speed detected by the vehicle speed sensor 12.

The steering angle sensor 15 detects a steering angle of the vehicle. That is, the steering angle sensor 15 detects a direction to which the vehicle runs.

The brake pedal position sensor 16 detects whether a brake pedal is pushed or not. That is, the brake pedal position sensor 16 as well as the accelerator pedal position sensor 11 detects the driver's acceleration will.

The navigation device 17 is a device which informs the driver of a route to a destination. The navigation device 17 includes an input/output portion inputting or outputting information for guidance of the route, a current position detecting portion detecting information on a current position of the vehicle, a memory in which a map data for calculating the route and a data for guiding the route are stored, and a control portion for searching the route and performing guidance of the route.

The GPS 18 receives a signal transmitted from a GPS satellite and transmits a signal corresponding thereto to the navigation device 17.

The distance sensor 19 detects a distance between the vehicle of the driver and a preceding vehicle. Various sensors such as an ultrasonic wave sensor and a infrared sensor may be used as the distance sensor 19.

The road shape determiner 20 determines a road shape on which the vehicle currently drives based on the data detected by the data detector 10. The road shape determiner 20 may detect a specific road shape such as a downhill road and an inclined road. The specific road shape such as the downhill road and the inclined road may be detected based on the current position of the vehicle and the map data stored in the navigation device 17.

The road shape determined by the road shape determiner 20 is transmitted to the engine brake tendency determiner 30 and engine brake operating stage determiner 40. For these purposes, the road shape determiner 20 is provided with one or more microprocessors, and the one or more microprocessors may be executed by a predetermined program for performing a method of determining the road shape.

The engine brake tendency determiner 30 calculates an engine brake strength index and an engine brake handling tendency index based on the road shape transmitted from the road shape determiner 20. That is, when the vehicle coasts a downhill road with a manual shift mode, the engine brake tendency determiner 30 may calculate engine brake strength index according to a region classified by a vehicle speed and a target engine speed where a current engine speed belongs, and the engine brake handling tendency index by accumulating the engine brake strength index during a predetermined time. For these purposes, the engine brake tendency determiner 30 is provide with one or more microprocessors, and the one or more microprocessors may be executed by a predetermined program for performing a method of determining the engine brake tendency.

The engine brake operating stage determiner 40 determines an engine brake operating stage based on the engine brake handling tendency index of the driver, and controls shift according to the engine brake operating stage. That is, the engine brake operating stage determiner 40 may change a shift pattern, engaging feeling to the target shift-speed, an engine torque map and/or an engine torque filter. For these purposes, the engine brake operating stage determiner 40 is provide with one or more microprocessors, and the one or more microprocessors may be executed by a predetermined program for performing a method of determining the engine brake operating stage and controlling the shift according to the engine brake operating stage.

Meanwhile, the engine brake operating stage determiner 40 may determine the engine brake operating stage by setting the engine brake handling tendency index as a basic value when the engine brake handling tendency index is not calculated.

In addition, each, some or all the data detector 10, the road shape determiner 20, engine brake tendency determiner 30 and engine brake operating stage determiner 40 may be provided in one CPU.

Hereinafter, a method of controlling the shift for the vehicle according to an exemplary embodiment of the present invention will be described in detail with reference to the accompanying drawings.

Figure 2:
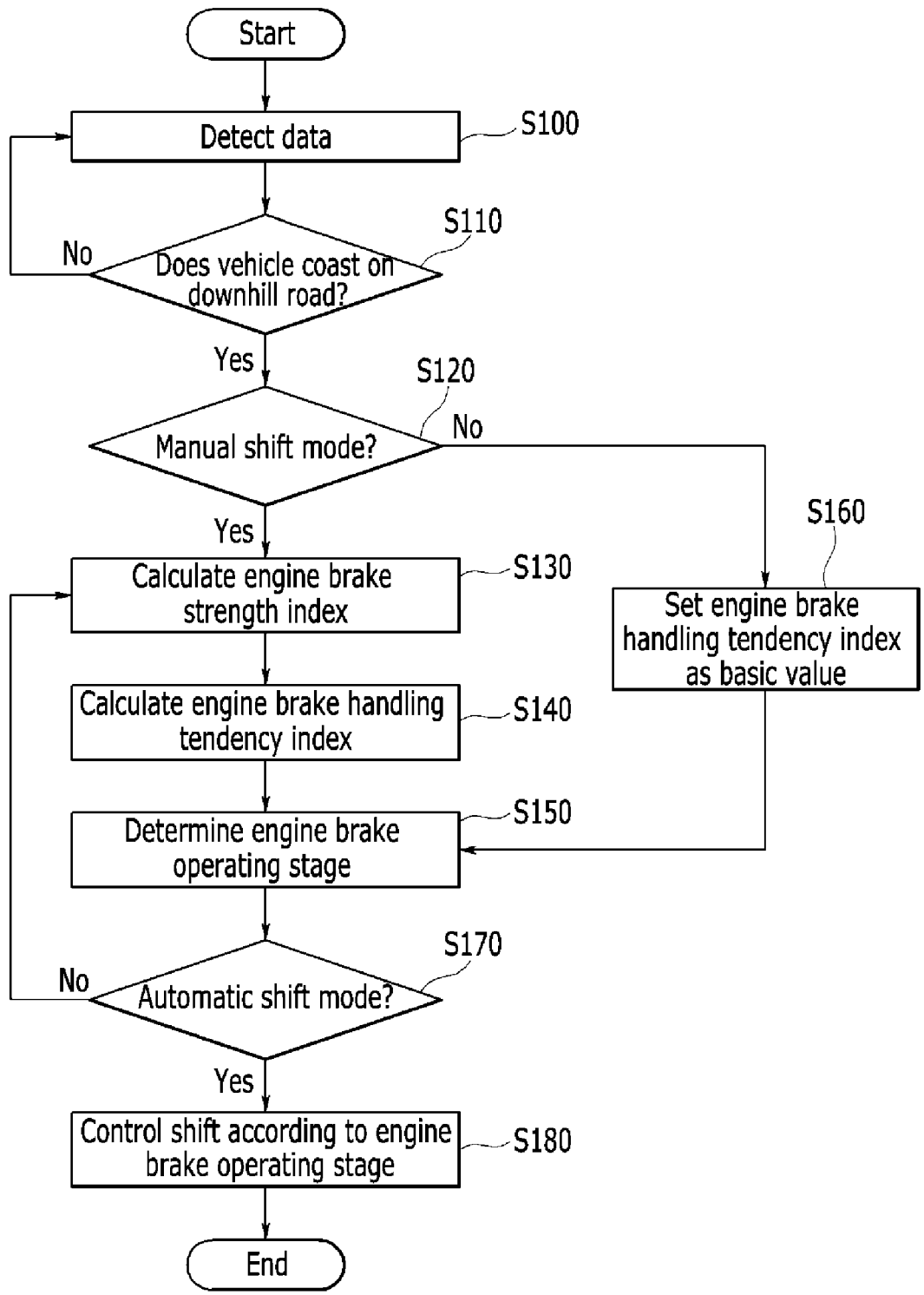
FIG. 2 is a flowchart of a method of controlling shift for a vehicle according to an exemplary embodiment of the present invention.

FIG. 2 is a flowchart of a method of controlling shift for a vehicle according to an exemplary embodiment of the present invention.

The method of controlling the shift for the vehicle according to an exemplary embodiment of the present invention begins with detecting the data for a shift control at step S100.

If the data detector 10 detects the data for the shift control, the road shape determiner 20 determines whether the road is a downhill road and the vehicle currently coasts based on the data transmitted from the data detector 10 at step S110. For example, the road may be the downhill road if a gradient of the road is lower than a predetermined value, and the vehicle may currently coast if a position value of the accelerator pedal is 0%.

If the vehicle currently coasts on the downhill road at the step S110, the engine brake tendency determiner 30 determines whether a shift mode of the vehicle is a manual shift mode based on the data transmitted from the data detector 10 at step S120.

If the shift mode of the vehicle is the manual shift mode at the step S120, the engine brake tendency determiner 30 calculates an engine brake strength index at step S130.

Figure 3:
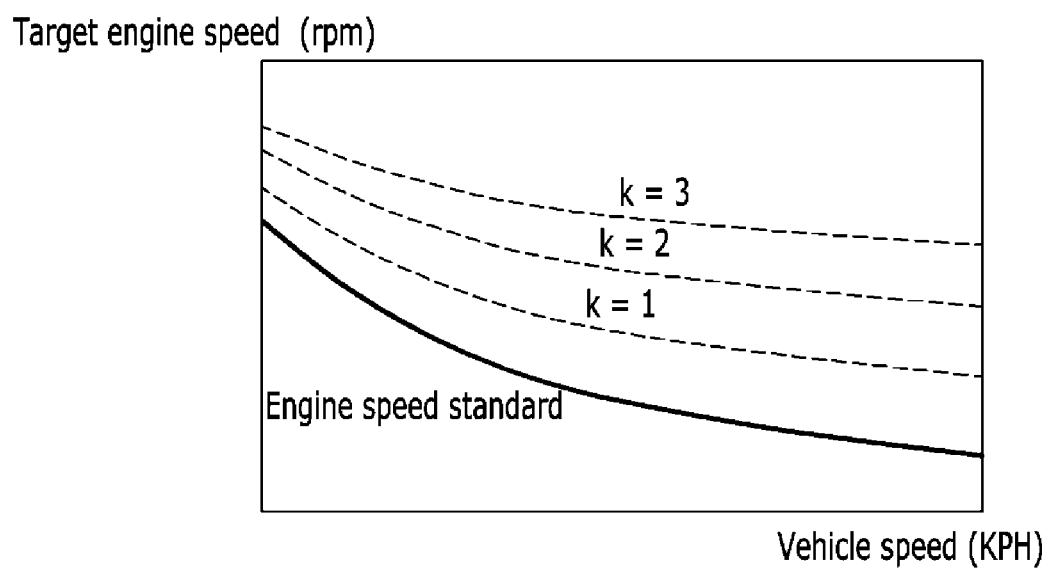
FIG. 3 is a graph showing a region classified by a vehicle speed and a target engine speed for calculating an engine brake strength index according to an exemplary embodiment of the present invention.

FIG. 3 is a graph showing a region classified by a vehicle speed and a target engine speed for calculating an engine brake strength index according to an exemplary embodiment of the present invention.

As shown in FIG. 3, a curved line of the engine speed standard is illustrated according to the vehicle speed in order to determine the engine brake operating tendency of the driver.

If the vehicle enters the manual shift mode during coasting on the downhill road, the engine brake tendency determiner 30 measures the engine speed in real time. Then, the engine brake tendency determiner 30 calculates the engine brake strength index (k) according to the measured engine speed which exceeds the engine speed standard.

That is, the engine brake strength index (k) may be calculated according to the region classified by the vehicle speed and the target engine speed where the current engine speed belongs. For example, if the driver operates the engine brake frequently, the engine speed exceeds the target engine speed significantly. Thus, the engine brake strength index may be calculated as a high value, and the deceleration tendency of the driver may be determined to be strong.

If the engine brake strength index is calculated at the step S130, the engine brake tendency determiner 30 calculates an engine brake handling tendency index at step S140.

The engine brake handling tendency index may be calculated by accumulating the engine brake strength index during a predetermined time.

If the engine brake handling tendency index is calculated at the step S140, the engine brake tendency determiner 30 transmits the engine brake handling tendency index to the engine brake operating stage determiner 40, the engine brake operating stage determiner 40 determines an engine brake operating stage based on the engine brake handling tendency index at step S150.

On the contrary, if the shift mode of the vehicle is not the manual shift mode at the step S120, the engine brake operating tendency may not be determined. Therefore, the engine brake tendency determiner 30 sets the engine brake handling tendency index as a basic value, and transmits the engine brake handling tendency index to the engine brake operating stage determiner 40 at step S160.

That is, the engine brake operating stage determiner 40 may determine the engine brake operating stage based on the engine brake handling tendency index set as the basic value or the engine brake handling tendency index calculated according to the engine brake strength index.

After that, the engine brake operating stage determiner 40 determines whether the shift mode of the vehicle is an automatic shift mode at step S170, and controls shift according to the determined engine brake operating stage if the shift mode of the vehicle is an automatic mode at step S180.

Figure 4:
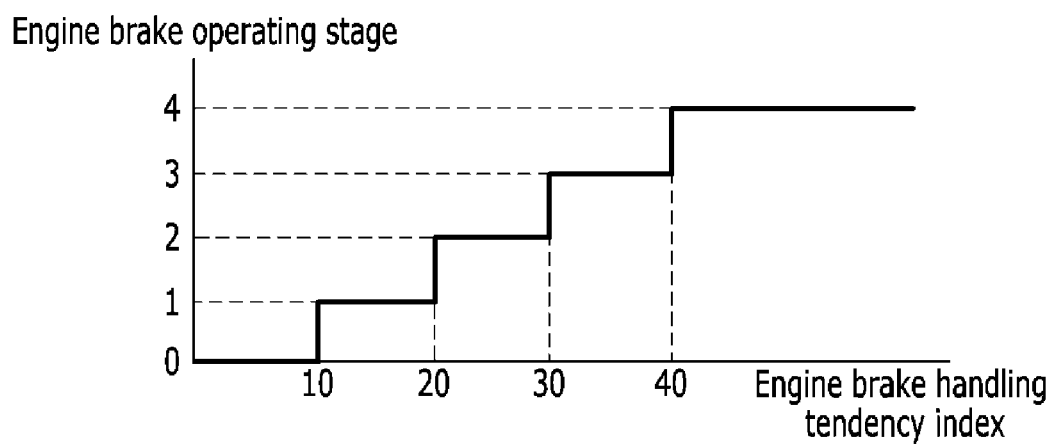
FIG. 4 is a graph showing an engine brake operating stage determined by an engine brake handling tendency index according to an exemplary embodiment of the present invention.

FIG. 4 is a graph showing an engine brake operating stage determined by an engine brake handling tendency index according to an exemplary embodiment of the present invention.

As shown in FIG. 4, if the vehicle coasts on the downhill road with the automatic shift mode after calculating the engine brake handling tendency index, the engine brake operating stage may shift downward according to the calculated engine brake handling tendency index. Therefore, a shift-speed of the vehicle after operating the engine brake may be determined to a shift-speed calculated by subtracting the engine brake operating stage from a shift-speed of shift pattern.

As described above, according to an exemplary embodiment of the present invention, the engine brake amount is adjusted by controlling shift according to deceleration tendency of a driver on a downhill road, so a disharmony of the driver may be minimized.

The foregoing descriptions of specific exemplary embodiments of the present invention have been presented for purposes of illustration and description. it is to be understood that the invention is not limited to the disclosed embodiments. On the contrary, it is intended to cover various modifications and equivalent as well as various alternatives and modifications thereof. It is intended that the scope of the invention be defined by the Claims appended hereto and their equivalents.

What is claimed is:

1. A system of controlling shift for a vehicle comprising:
a data detector configured to detect data for a shift control;
a road shape determiner configured to determine a road shape of an inclined road based on the data;
an engine brake tendency determiner configured to determine an engine brake operating tendency of a driver based on the data; and
an engine brake operating stage determiner configured to determine an engine brake operating stage based on the road shape and the engine brake operating tendency of the driver,
wherein the system controls the shift according to the engine brake operating stage determined by the engine brake operating determiner.

2. The system of claim 1, wherein the data comprises information on at least one of a speed of the vehicle, an acceleration of the vehicle, a shift-speed, a position of an accelerator pedal, a position of a brake pedal, a steering angle of the vehicle, and a distance between the driver's vehicle and a forward vehicle.

3. The system of claim 1, wherein the shift control comprises a change of a shift pattern, a change of engaging feeling to a target shift-speed, a change of an engine torque map and a change of an engine torque filter.

4. The system of claim 1, wherein the engine brake tendency determiner determines the engine brake operating tendency of the driver by determining an engine brake strength index and an engine brake handling tendency index when the vehicle currently coasts on a downhill road with a manual shift mode.

5. The system of claim 4, wherein the engine brake strength index is determined according to a region classified by a vehicle speed and a target engine speed where a current engine speed belongs.

6. The system of claim 5, wherein the engine brake handling tendency index is determined by accumulating the engine brake strength index during a predetermined time.

7. The system of claim 4, wherein the engine brake operating stage determiner determines the engine brake operating stage based on the engine brake handling tendency index determined by the engine brake tendency determiner.

8. The system of claim 4, wherein the engine brake operating stage determiner determines the engine brake operating stage by setting the engine brake handling tendency index as a basic value when the engine brake handling tendency index is not determined.

9. A method of controlling shift for a vehicle comprising:
detecting data for a shift control;
determining whether the vehicle currently coasts on a downhill road;
determining whether a shift mode of the vehicle is a manual shift mode when the vehicle currently coasts on the downhill road;
determining an engine brake handling tendency index when the shift mode of the vehicle is the manual shift mode;
determining an engine brake operating stage based on the engine brake handling tendency index; and
controlling a shift according to the engine brake operating stage when the shift mode of the vehicle is an automatic shift mode.

10. The method of claim 9, further comprising setting the engine brake handling tendency index as a basic value when the shift mode of the vehicle is not the manual shift mode.

11. The method of claim 9, wherein the engine brake handling tendency index is determined by determining an engine brake strength index.

12. The method of claim 11, wherein the engine brake strength index is determined according to a region classified by a vehicle speed and a target engine speed where a current engine speed belongs.

13. The method of claim 12, wherein the engine brake handling tendency index is determined by accumulating the engine brake strength index during a predetermined time.

14. The method of claim 9, wherein the data comprises information on at least one of a speed of the vehicle, an acceleration of the vehicle, a shift-speed, a position of an accelerator pedal, a position of a brake pedal, a steering angle of the vehicle, and a distance between the driver's vehicle and a forward vehicle.

* * * * *